(12) United States Patent
Chan et al.

(10) Patent No.: US 7,370,116 B2
(45) Date of Patent: May 6, 2008

(54) APPROACH TO MINIMIZE WORST-CASE QUEUING DELAY FOR A SWITCHING COMMUNICATION SYSTEM WITH TRANSMISSION CONSTRAINTS

(75) Inventors: Wai-Chung Chan, Germantown, MD (US); Chi-Jiun Su, Derwood, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 11/499,416

(22) Filed: Aug. 4, 2006

(65) Prior Publication Data

US 2006/0271704 A1   Nov. 30, 2006

Related U.S. Application Data

(63) Continuation of application No. 09/670,124, filed on Sep. 26, 2000, now abandoned.

(60) Provisional application No. 60/198,580, filed on Apr. 16, 2000.

(51) Int. Cl.
  *G06F 15/16* (2006.01)
(52) U.S. Cl. .................................................... 709/232
(58) Field of Classification Search ................. 709/232
  See application file for complete search history.

(56) References Cited

U.S. PATENT DOCUMENTS

| | | | | |
|---|---|---|---|---|
| 4,914,650 A | * | 4/1990 | Sriram | 370/235 |
| 5,036,523 A | * | 7/1991 | Briskman | 375/141 |
| 5,392,280 A | * | 2/1995 | Zheng | 370/353 |
| 5,463,620 A | * | 10/1995 | Sriram | 370/412 |
| 5,844,890 A | * | 12/1998 | Delp et al. | 370/230 |
| 5,859,835 A | * | 1/1999 | Varma et al. | 370/229 |
| 5,889,779 A | * | 3/1999 | Lincoln | 370/398 |
| 5,926,458 A | | 7/1999 | Yin | |
| 5,926,459 A | * | 7/1999 | Lyles et al. | 370/230 |

(Continued)

FOREIGN PATENT DOCUMENTS

EP    0 886 403 A1    6/1997

OTHER PUBLICATIONS

Inder S. Gopal, Maurizio A. Bonuccelli, and C. K. Wong XP-002275841, IEEE Transactions on Communications, vol. Com-31, No. 8, Aug. 1983, "Scheduling In Multibeam Satellites With Interfering Zones", pp. 941-951.

(Continued)

*Primary Examiner*—Jason D Cardone
*Assistant Examiner*—Thomas Duong
(74) *Attorney, Agent, or Firm*—Bell, Boyd & Lloyd LLP

(57) ABSTRACT

An approach for minimizing queuing delay of packets is disclosed. M number of queues are configured to store packets. A memory stores a search order table that has table entries corresponding to the M queues. Specifically, the table entries store values that correspond to relative positions of the M queues and that are selected based upon a transmission constraint of the communication system. A scheduler is coupled to the memory and is configured to schedule transmission of the packets stored in the M queues based upon the search order table. According to one embodiment of the present invention, this queuing mechanism is applied in a satellite communication system with transmission constraints to the downlink cells.

21 Claims, 10 Drawing Sheets

U.S. PATENT DOCUMENTS

| | | | |
|---|---|---|---|
| 5,943,340 A * | 8/1999 | Iemura | 370/431 |
| 5,959,993 A * | 9/1999 | Varma et al. | 370/397 |
| 5,991,867 A * | 11/1999 | Fosmark | 712/16 |
| 6,075,791 A * | 6/2000 | Chiussi et al. | 370/412 |
| 6,247,061 B1 * | 6/2001 | Douceur et al. | 709/240 |
| 6,272,109 B1 * | 8/2001 | Pei et al. | 370/230 |
| 6,324,184 B1 * | 11/2001 | Hou et al. | 370/468 |
| 6,335,922 B1 * | 1/2002 | Tiedemann et al. | 370/335 |
| 6,377,579 B1 * | 4/2002 | Ofek | 370/395.4 |
| 6,407,999 B1 * | 6/2002 | Olkkonen et al. | 370/389 |
| 6,438,630 B1 * | 8/2002 | DeMoney | 710/56 |
| 6,480,911 B1 * | 11/2002 | Lu | 710/54 |
| 6,483,839 B1 * | 11/2002 | Gemar et al. | 370/395.42 |
| 6,496,899 B1 * | 12/2002 | DeMoney | 711/112 |
| 6,526,575 B1 * | 2/2003 | McCoy et al. | 725/36 |
| 6,557,057 B2 * | 4/2003 | Swaminathan | 710/54 |
| 6,567,415 B1 * | 5/2003 | Elwalid et al. | 370/412 |
| 6,580,703 B1 * | 6/2003 | Okubo et al. | 370/335 |
| 6,714,517 B1 * | 3/2004 | Fawaz et al. | 370/236 |
| 6,738,346 B1 * | 5/2004 | Prieto et al. | 370/229 |
| 7,133,380 B1 * | 11/2006 | Winters et al. | 370/329 |

OTHER PUBLICATIONS

Yen F. Wong, and James L. Rash, NASA Goddard Space Flight Center, Greenbelt, Maryland, "A Method For Interference Mitigation In Space Communications Scheduling", pp. 431-435.

David J. Goldstein and David S. Eccles, The Aerospace Corporation, Modeling and Simulation Department, Los Angeles, CA, "GRS: A Dynamic GBS Downlink Beam Scheduling Tool", pp. 3-13.

* cited by examiner

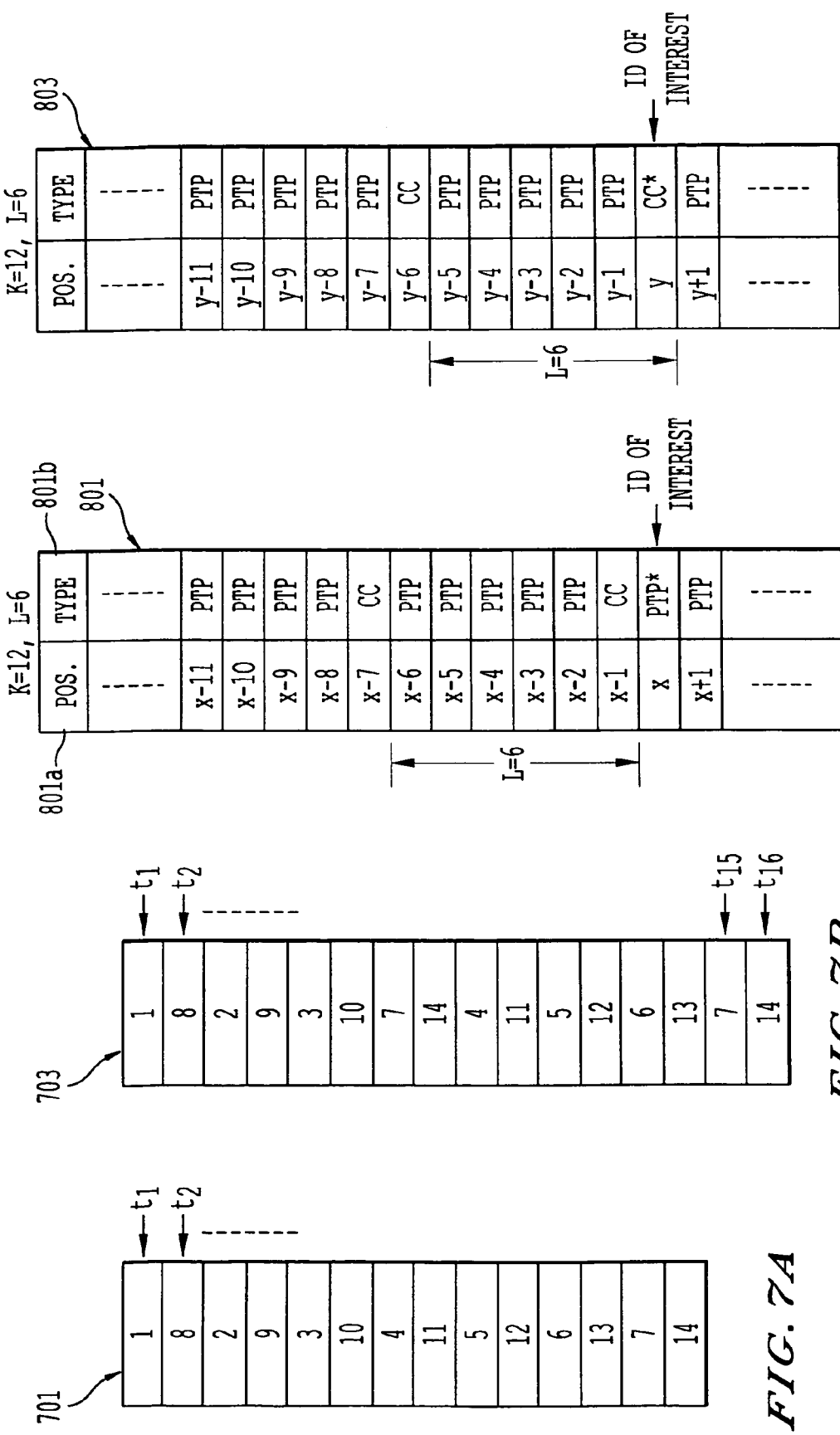

| 1000 → | DEST. ADDRESS | UPLINK RATE | REQUEST TYPE | RATE REQUEST | DEST. DOWNLINK | REQUEST PRIORITY |
|---|---|---|---|---|---|---|
| | 1001 | 1003 | 1005 | 1007 | 1009 | 1011 |

*FIG. 10A*

| 1020 → | SOURCE ADDRESS | RATE/No. OF SLOTS | LAST |
|---|---|---|---|
| | 1021 | 1023 | 1025 |

*FIG. 10B*

| 1040 → | SOURCE ADDRESS | REQUEST ID | TYPE |
|---|---|---|---|
| | 1041 | 1043 | 1045 |

*FIG. 10C*

APPROACH TO MINIMIZE WORST-CASE QUEUING DELAY FOR A SWITCHING COMMUNICATION SYSTEM WITH TRANSMISSION CONSTRAINTS

CROSS-REFERENCES TO RELATED APPLICATION

The present application is a continuation of U.S. application Ser. No. 09/670,124, filed Sep. 26, 2000 now abandoned, entitled "An Approach to Minimize Worst-Case Queueing Delay for a Switching Communication System with Transmission Constraints," which claims the benefit of the earlier filing date of, U.S. Provisional Patent Application No. 60/198,580, filed Apr. 16, 2000, entitled "An Approach to Minimize Worst-Case Queueing Delay for a Switching Communication System with Transmission Constraints" the entireties of which are incorporated herein by reference.

BACKGROUND OF THE INVENTION

1. Field of the Invention

The present invention relates generally to communication systems, and is more particularly related to providing fairness in the servicing of queues in a switching communication system.

2. Discussion of the Background

As businesses and society, in general, become increasingly reliant on communication networks to conduct a variety of activities, ranging from business transactions to personal traffic congestion. For example, the maturity of electronic commerce and acceptance of the Internet as a daily tool pose an enormous challenge to communication engineers to develop techniques to reduce network latency and user response times. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure.

Network latency is attributable, in part, to queueing delays. Conventionally, queueing delays are difficult to predict or bound, in part, because of the correlation between the output traffic and the input traffic, which can exhibit a wide variety of behaviors (e.g., stochastic, deterministic, or a combination thereof). As a result of the inability to readily determine an upper bound on the queueing delay, applications cannot efficiently determine a timeout period for retransmitting lost or greatly delayed packets. Without accurate knowledge of the upper bound, the end users are unable to receive a guarantee on their application response times. To further exacerbate the increased response times, the delays are not uniform across the users; that is, some users, by virtue of the relative position of the queues that store their traffic, may experience significantly more delay than other users. Thus, the queues are not serviced fairly during network congestion, for example.

One traditional approach to minimizing queueing delays is to upgrade the hardware to increase capacity—e.g., processing power. The main drawback with this forklift approach is cost. Further, in some systems, such as a communication satellite, hardware replacement is impractical.

Based on the foregoing, there is a clear need for improved approaches to minimizing queueing delay.

There is also a need to optimize the use of existing network hardware.

There is also a need to determine an upper bound of the worst-case queueing delays.

Based on the need to improve system throughput, an approach for providing fairness by minimizing queueing delays is highly desirable.

SUMMARY OF THE INVENTION

According to one aspect of the invention, a method is provided for minimizing queueing delay of packets in a communication system. The method includes retrieving a search order table that has a plurality of table entries corresponding to M queues that selectively store the packets. The table entries store values that correspond to the relative positions of the M queues and that are selected based upon a transmission constraint of the communication system. The method also includes scheduling transmission of the packets that are stored in the M queues based upon the search order table. Under this approach, the output delay is minimized, and the upper bound is known.

According to another aspect of the invention, a communication system for minimizing queueing delay of packets comprises M queues that are configured to store the packets. A memory stores a search order table that has a plurality of table entries corresponding to the M queues. The table entries store values that correspond to relative positions of the M queues and that are selected based upon a transmission constraint of the communication system. A scheduler is coupled to the memory and is configured to schedule transmission of the packets stored in the M queues based upon the search order table. The above arrangement controls queueing delays and provides fair servicing of the queues.

According to another aspect of the invention, a switching device comprises a plurality of input ports. Each of the input ports is configured to receive a plurality of packets. A plurality of queues are configured to store the plurality of packets. A memory stores a search order table that has a plurality of table entries. The table entries store values that correspond to relative positions of the plurality of queues and that are selected based upon a transmission constraint, wherein the number of queues is M. A scheduler is coupled to the memory and configured to schedule transmission of the packets stored in the queues based upon the search order table. A plurality of output ports are configured to transmit the stored packets in the plurality of queues based upon the transmission constraint, wherein the stored packets in N number of M queues are selected for transmission. Under this arrangement, the worst-case queueing delay can be minimized, and the upper-bound can be computed independent of the traffic load and the traffic characteristics.

In yet another aspect of the invention, a computer-readable medium carrying one or more sequences of one or more instructions for minimizing queueing delay of packets in a communication system is disclosed. The one or more sequences of one or more instructions include instructions which, when executed by one or more processors, cause the one or more processors to perform the step of retrieving a search order table that has a plurality of table entries corresponding to M queues that selectively store the packets. The table entries store values that correspond to relative positions of the M queues and that are selected based upon a transmission constraint of the communication system. Another step includes scheduling transmission of the packets stored in the M queues based upon the search order table. This approach advantageously provides fair servicing of queues.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7A and 7B are diagrams of exemplary search order tables implementing a single transmission constraint, in accordance with an embodiment of the present invention;

FIGS. 8A and 8B are diagrams of exemplary search order tables implementing multiple transmission constraints, in accordance with an embodiment of the present invention;

FIGS. 10A-10C are diagrams of the formats of a bandwidth request packet, an allocation packet, and an acknowledgement packet, respectively, in accordance with an embodiment of the present invention.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention minimizes queueing delay of packets, in which multiple queues are configured to store packets for transmission. A memory stores a search order table that has table entries corresponding to the queues. Specifically, the table entries store values that correspond to the relative positions of the queues and that are selected based upon a transmission constraint of the communication system. A scheduler schedules transmission of the packets that are stored in the queues based upon the search order table. A class of search order tables are generated that satisfy multiple transmission constraints. In addition, by repeating table entries in the search order table, unbalanced traffic loads can be accommodated. This queueing mechanism has applicability to a packet-switched satellite communication system with an on-board switch; the switch has transmission constraints such that the transmitters of the satellite at the output port of the switch cannot simultaneously transmit to downlink cells that contain station terminals that are within an interfering distance from one another.

Figure 1:
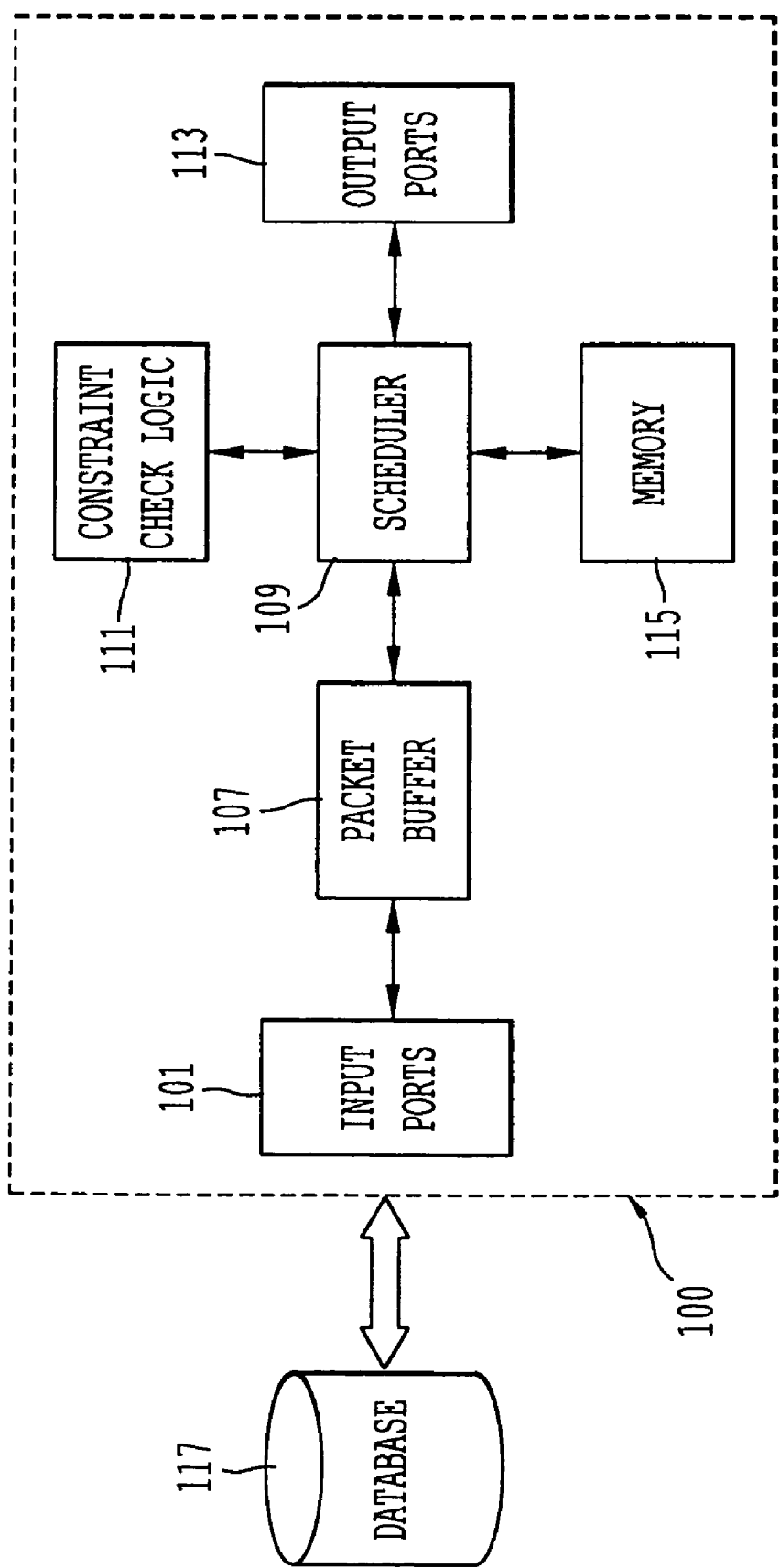
FIG. 1 is a block diagram of a switch with a queueing mechanism, in accordance with an embodiment of the present invention.

FIG. 1 shows a functional block diagram of a switch with a queueing mechanism, according to an embodiment of the present invention. Switch 100 includes multiple input ports 101 that receive incoming traffic from a source node (not shown) A packet buffer 107 stores packets from input ports 101, in which the stored packets in packet buffer 107 are transmitted to a scheduler 109. The scheduler 109 communicates with a constraint check logic 111 to determine whether the stored packets conform with established transmission constraints.

Scheduler 109 examines the destination addresses of the packets that are stored in packet buffer 107 using a round-robin scheme and forwards such packets to an appropriate output port among the various output ports 113. The scheduler 109 schedules the packet transmissions using a search order table that is stored in a memory 115. As will be more fully discussed in FIG. 5, the search order table effectively orders the queues within the packet buffer 107 according to various transmission constraints to maximize system throughput. The search order table that is stored in memory 115, in an exemplary embodiment, can be retrieved from a class of search order tables that are stored in a database 117, which can be either locally located within the switch 100 or externally located from the switch 100.

Figure 2:
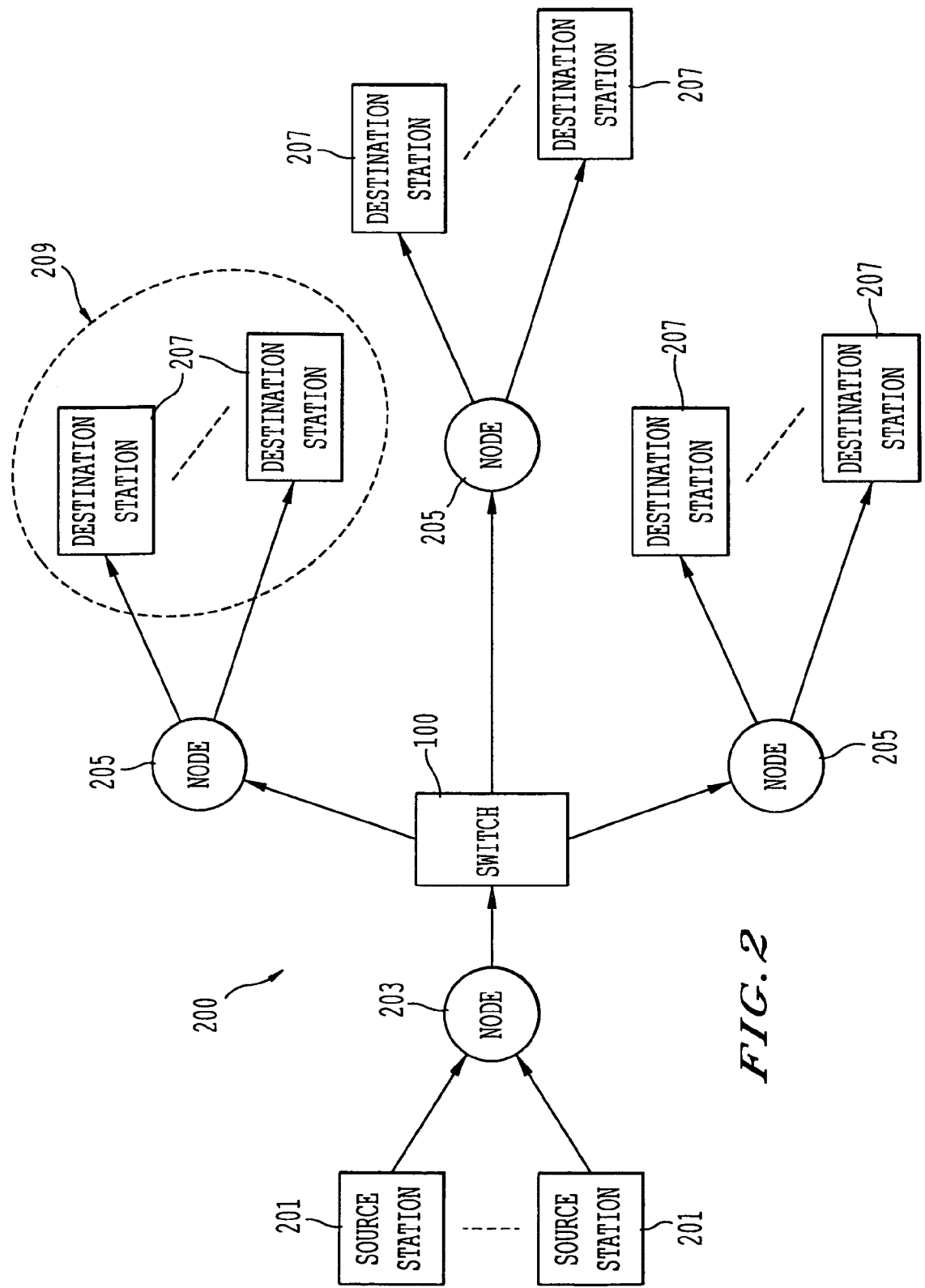
FIG. 2 is a diagram of a communication network that utilizes the switch of FIG. 1.

FIG. 2 shows a communication network that utilizes the switch of FIG. 1. A communication network 200 includes multiple source stations 201 that generate traffic to node 203, which can be any networking equipment that transfers data. In an exemplary embodiment, node 203 is an internetworking device, such as a router; alternatively, node 203 may be any type of gateway in a land-based or satellite-based communication system. Node 203 is connected to an input port (FIG. 1) of switch 100. The output ports (FIG. 1) of switch 100 connects to multiple nodes 205, which can be the same networking component as that of node 203. As shown, each of the nodes 205 can potentially communicate with numerous destination stations 207 within region 209 (e.g., sub-network). For example, if nodes 205 are routers, the routers would have multiple output ports designated for region 209.

As indicated previously, the conventional communication network exhibits performance characteristics that are dictated largely by the hardware limitations of switch 100. In other words, the throughput of the network 200 depend on such parameters as buffer size and processing capability of switch 100. In some practical systems, however, the communication network 200 possess network bottlenecks at points in the network other than the switch 100. For example, assuming that for security reasons, destination stations 207 within region 209 cannot simultaneously receive packets, consequently switch 100 may need to buffer some of the packets until the first set of packets are delivered to the particular destination stations 207. Thereafter, the buffered packets within switch 100 can be delivered to the destination stations 207 within region 209. From this example, it is clear that the buffering of the packets within switch 100 can result in system performance that does not depend on the hardware capabilities of switch 100, but instead on the network constraints associated with region 209.

The above scenario is characteristic of a satellite communication system. For the purposes of explanation, the operation of the queueing mechanism according to an embodiment of the present invention, is discussed with respect to a satellite communication system with transmission constraints to the downlink cells. However, it should be noted that the approach has applicability to many other switching systems, as recognized by one of ordinary skill in the art. For example, the switching systems may include an ATM (Asynchronous Transfer Mode)/SONET (Synchronous Optical Network) network, a Gigabit Ethernet network, and voice network. The end stations of these systems are referred to as destination sites. Accordingly, the destination sites in a satellite system would be downlink cells.

Figure 3:
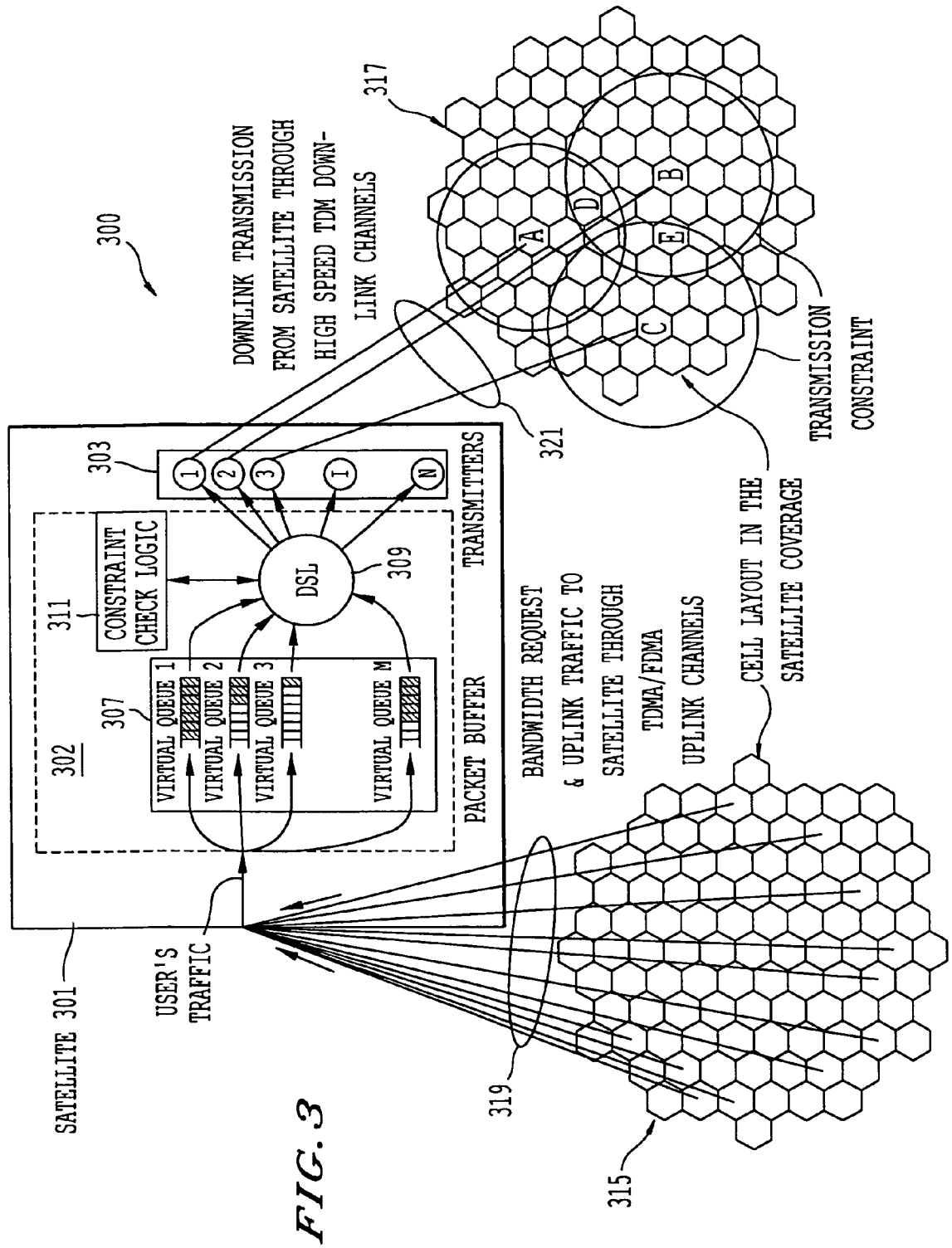
FIG. 3 is a diagram of a satellite communication system employing the switch of FIG. 1.

FIG. 3 shows a satellite communication system with an on-board switch, in accordance with an embodiment of the present invention. The communication system 300 is a packet-switched satellite communication system, which includes a satellite payload 301 that has a switch 302. The switch 302 is connected to multiple transmitters 303; that is, N transmitters. Switch 302 includes a downlink scheduler 309, and a constraint check logic 311. One of ordinary skill in the art would recognize that the downlink scheduler 309, and constraint check logic 311 may be implemented via software, hardware (e.g., general processor, an Application Specific Integrated Circuit (ASIC), etc.), firmware or a combination thereof.

M first-in-first-out queues 307 and M corresponding output ports are present in the switch 302. Each output port (not shown) is associated with a physical location (or destination) on the footprint of the satellite which has its own required transmit power and azimuth and elevation angles. Different destinations are said to be interfering with one another if their azimuth and elevation angles are within a predetermined system interference limit. In other non-satellite applications, "interference" between different destinations or output ports may be due to the sharing of a common resource, such as a transmitter or a bus.

N transmitters 303 are used; in an exemplary embodiment, the number of transmitters N is less than the number of queues 307 (i.e., N<M). In each downlink time slot, the scheduler (or downlink scheduler logic) 309 of the switch 302 searches for a maximum of N bursts from the M queues for transmissions. According to one embodiment, each queue 307 (or destination) can have at most one burst selected in each downlink time slot. Further, all the bursts that are selected must satisfy the following transmission constraints: (1) the destinations do not interfere with one another, and (2) the total power required by all the transmissions is smaller than the peak available power of the communication system 300.

In switching communication system 300, station terminals (ST) (not shown) originate traffic from a coverage area 315. The generated traffic from the STs is transferred through switch 302 and terminate at destination STs (not shown) within coverage area 317. It should be noted that the destination STs can be within the same coverage area 315 as the originating STs.

A connection that is established between a source ST and a destination ST is controlled by a network operation center (NOC). The NOC (not shown), which is based on the ground, provides management functions for the system 300. According to one embodiment of the present invention, the database 117 (FIG. 1) that stores the search order tables is maintained in the NOC. An ST needs to obtain authorization from the NOC before making a request to the satellite payload 301. However, once an ST has received authorization from the NOC, the ST is likely to receive a rate allocation from the satellite payload 301 because the NOC keeps track of the total uplink (and downlink) bandwidth available for connections and will block a connection request if there is insufficient satellite capacity available to satisfy the request.

The scheduler logic 309 utilizes a class of search order tables, which are stored in the memory 115 (FIG. 1) of the switch 302. The switch 302 searches for qualified transmissions such that the resultant worst-case queueing delays of all transmissions can be minimized and the upperbound can be computed, independent of the pattern and variation of the traffic arriving at the switch 302. The class of search order tables is constructed by taking into account both interference between destinations and transmitted power to destinations.

The system 300 operates in the 29.5-30.0 GHz Earth to Space direction and operates in the 19.7-20.2 GHz Space to Earth direction (i.e., "A" band), in accordance with one embodiment. There is therefore 500 MHz of spectrum available in each direction of transmission. The 500 MHz is divided into 8 sub-bands each 62.5 MHz wide. The frequency band that is used to carry traffic from STs to a satellite's payload 301 within each cell (uplink beam) encompasses one or more 62.5 MHz sub-bands. Each sub-band is further divided into a number of channels that operate at three different bit rates. For convenience, these channels are referred to as 512 kbps, 2 Mbps, and 16 Mbps channels, although both the total bit rates and the net user data rates for each of these channels is somewhat above these nominal figures. The 512 kbps channels have two operating modes, a normal mode, and a fall-back mode, which can be used during rain fades to provide additional link margin. The uplink frame structure, in an exemplary embodiment, during normal operation is a 96 ms frame with 32 slots of 3 ms each, supporting uplink channel rates 512 kbps, 2 Mbps, and 16 Mbps. The number of packets within a slot varies by channel rate. Each time slot is sized to match one uplink-transmitted burst. Each burst has a header and a body. The header contains synchronizing information so the satellite demodulator (not shown) can recover the burst. The body contains two, eight or sixteen data packets, corresponding to transmission rates of 512 kbps, 2 Mbps, and 16 Mbps, respectively.

Under normal operating conditions (i.e., no fading), an ST within coverage area 315 transmits at a maximum rate of 512 kbps, 2 Mbps, and 16 Mbps. However, in the presence of fading, a 2 Mbps ST may switch down to a 512 kbps channel. Similarly, an ST transmitting at 512 kbps may switch down to a 128 kbps fall-back channel. The 128 kbps mode (or fall-back mode) uses eight slots per frame instead of 32 slots per frame, with two data packets per burst. All transmission rates use Offset QPSK modulation; filtering is 25 percent raised root cosine. The 128 kbps transmission rate is intended as a mechanism to reduce the uplink rate during poor propagation conditions to improve link availability.

In an exemplary embodiment, the satellite may have 224 active uplink demodulators (not shown). Each uplink demodulator supports the equivalent of three 16 Mbps channels. Each 16 Mbps channel can be configured as a single 16 Mbps channel or eight 2 Mbps channels. Likewise, if the uplink demodulator is configured for eight 2 Mbps channels, each of the eight channels can be utilized as a single 2 Mbps channel or four 512 kbps channels. Thus, the capacity of the satellite is 21,504 channels if all the channels are configured as 512 kbps.

The communication system 300 supports two types of uplink channels: (1) contention channels, and (2) data channels. An uplink channel can be configured as either a contention channel or a data channel at any given time, but not both simultaneously. Contention channels are used by an ST for bandwidth allocation requests to the satellite payload 301. Bandwidth allocations are made periodically by the satellite payload 301. After making its allocations, the satellite payload 301 transfers any totally unallocated data channels to the contention channels. Allocations are packed into a downlink multicast to all ST in each uplink beam. This multicast also provides notification of any additional contention channels, above the already configured contention channels, which are available to the ST in the beam.

The service areas 315 and 317 are covered by a set of polygons that are fixed on the surface of the earth. Downlink polygons, called microcells, are hexagonal in shape as viewed from the spacecraft, with seven microcells clustered together to form an uplink polygon, called a cell. As used herein, the term microcell is used synonymously with the term downlink cell. The satellite generates a set of uplink circular beams that each encloses a cell. It also generates a set of downlink beams that each encloses a microcell.

Downlink packet bursts to individual microcells are transmitted with sufficient power to just close the link to an ST within the microcell. In addition, there is a "cellcast" mode that is used to transmit system-level information to all STs within an uplink cell when there are no rain fades in the cell. The transmit power to the center microcell is increased sufficiently to close the link to STs in any of the seven microcells within the uplink cell.

Polarization is employed to maximize the system capacity. The polarization is fixed, as are the satellite beams that serve the cells. Adjacent cells or cells that are separated by less than one cell diameter of the same polarization must split the spectrum; that is, such cells cannot use the same frequencies. However, adjacent cells on opposite polarization can use the same frequencies. The downlink beam operates on two polarizations simultaneously so that the frequency reuse ratio is 2:1. A total of 24 transmitters, 12 on RHC (Right-Hand Circular) polarization and twelve on the LHC (Left-Hand Circular) polarization serve the downlink cells. The transmitters serve all microcells by time hopping from microcell to microcell. With 24 transmitters, the theoretical frequency reuse ratio is 24:1.

Up to 12 downlink spot beams can be transmitted simultaneously on each polarization subject to minimum microcell separation distance limitations. Beams on the same polarization must be sufficiently separated spatially to avoid unacceptable co-channel interference. Another co-polarized beam is not allowed to transmit to another microcell within an ellipse or else excessive interference may occur. The "keep-out" areas apply separately and independently for the two polarizations; the link budgets account for any cross-polarization interference that may occur.

As shown in FIG. 3, on the downlink of communication system 300, at each TDMA transmission slot, the downlink scheduler 309 selects up to N bursts of packets from M virtual queues of the packet buffer 307 to transmit through N transmitters, based on the scheduling algorithm and transmission constraint checks. The scheduling algorithm, in an exemplary embodiment, is a round-robin scheme. Because the downlink scheduler 309 may not be able to find N bursts to transmit most of the time due to transmission constraints, downlink transmission capacity is greatly limited by transmission constraints. The downlink congestion in communication system 300 occurs when the amount of traffic admitted to the switch 302 exceeds the capacity of the downlink. In other words, if the satellite payload 301 made uplink allocations simply based on the availability of uplink slots, the satellite payload 301 would sometimes admit more traffic to a particular downlink cell (i.e., destination site) or cluster of mutually-interfering microcells than the downlink can carry. Consequently, the data packets for these areas would completely fill the packet buffer 307 in the payload's switch 302, resulting in dropped packets. Therefore, the availability of both uplink slots and downlink bandwidth factor into bandwidth allocations that is performed by the satellite payload 301.

The main transmission constraint in communication system 300 is the interference constraint; that is, two simultaneous downlink transmissions cannot be performed if they are directed at downlink cells which are within a system limit interference distance. In FIG. 3, because downlink cells A, B and C in coverage area 317 are outside the system limit interference distances (as shown by the overlapping circles) from one another, the satellite can simultaneously transmit packets to these downlink cells A, B, and C. However, simultaneous transmission cannot be directed to downlink cells D and A, downlink cells D and B, downlink cells E and B and downlink cells E and C since they are within the system limit interference distance. That is, these downlink cells are in the same circle.

To illustrate the downlink capacity limitation of the system 300 stemming from transmission constraints (in particular, interference constraints), a scenario in which there are packets in the virtual queues of packet buffer 307 that are destined only to downlink cells A, B, C, D and E is considered. It should be noted that without any constraint, there can be five transmissions at one TDMA slot; however, with the interference constraint, only a maximum of three transmissions at one TDMA slot is possible (to downlink cells A, B, and C). If the satellite is to transmit to downlink cell D or downlink cell E, there can be at most two transmissions only, either to downlink cells D and C or to downlink cells E and A.

Figure 4:
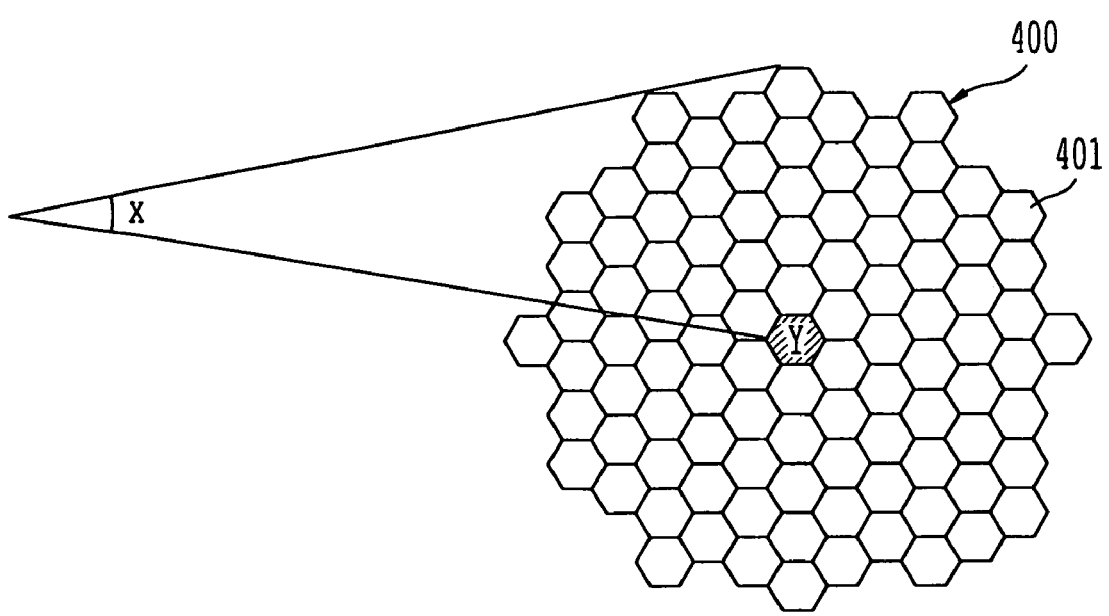
FIG. 4 is a diagram of an interference region of a target downlink cell, in accordance with an embodiment of the present invention.

FIG. 4 shows a diagram of an interference region of a target downlink cell defined according to an embodiment of the present invention. An interference region 400 includes a target downlink cell, which is surrounded by numerous downlink cells 401. Downlink cells 401 are clustered around target downlink cell Y within a radius that is determined by an angle x from a point of view of a satellite. The angle x can be set to any degree, depending on the coverage area and network application.

The transmission constraint of the system 300 dictates that simultaneous transmissions cannot be directed to any two downlink cells, which are within x degrees from each other, from the point of view of the satellite. In other words, if the satellite transmits to a target downlink cell, the satellite cannot transmit, at the same time, to any downlink cell around the target downlink cell that is within x degrees from the target downlink cell. The group of all the downlink cells, which are within x degrees from a target downlink cell, is defined as the interference region of the target downlink cell. The interference region 400 of a downlink cell can be obtained by comparing angles between any two downlink cells from the point of view of the satellite.

Figure 5:
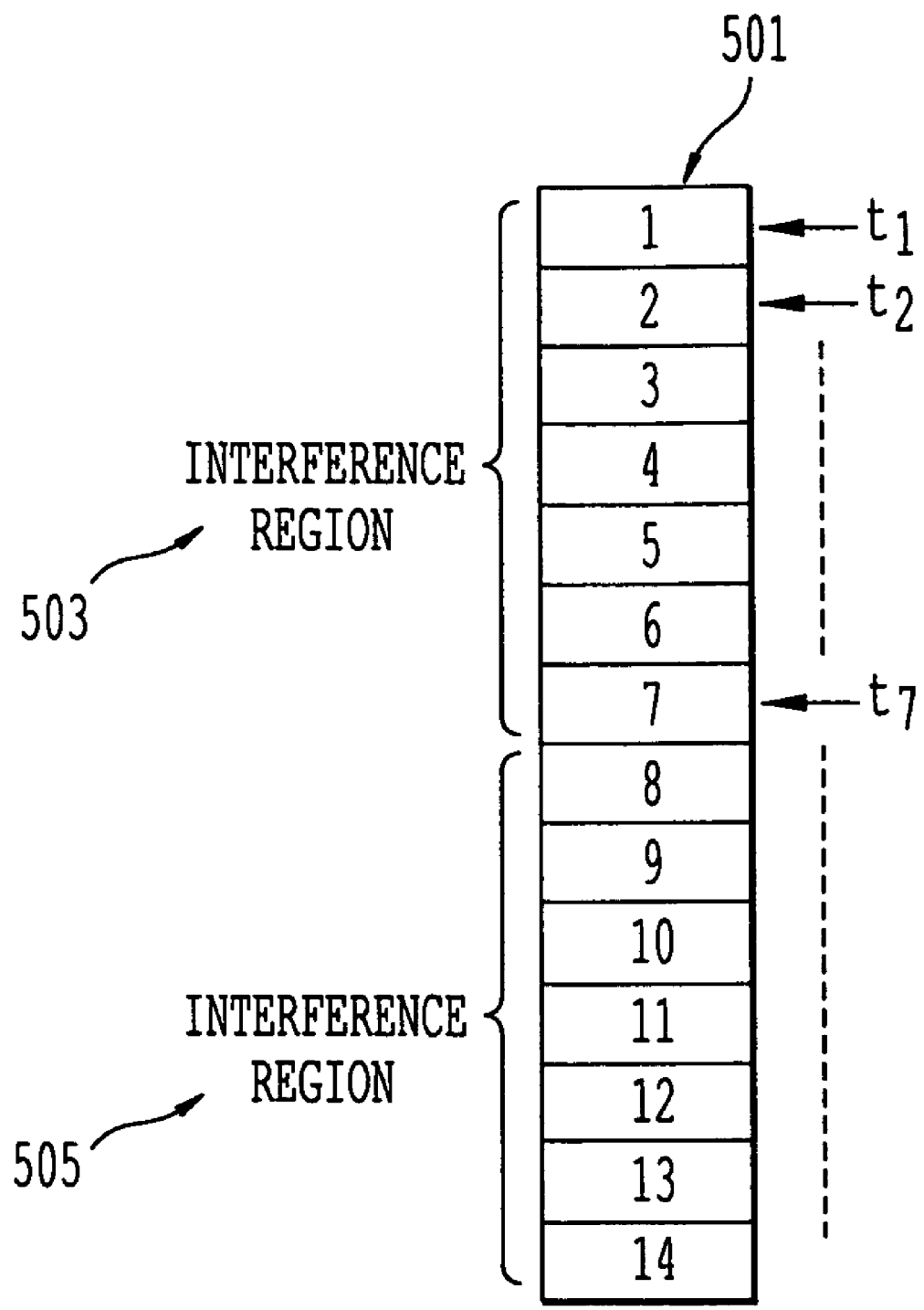
FIG. 5 is a diagram of a search order table with sequential ordering of the queues.

FIG. 5 shows a search order table with sequential ordering of the queues. Search order table 501 contains entries that correspond to the queues 307 (FIG. 3). In this example, queue 1 is in the first position of the search order table 501 with queue 2 being in the second position, etc. Because the scheduler 309 schedules in a round robin fashion, the scheduler 309 traverses the search order table 501 sequentially, looping back to the first position after processing the queue in the last position. The table entries, in this particular example, require that the queues 1-14 be processed from first to fourteenth, respectively. In other words, it is assumed that search order table 501 is in sequential order of the destinations, from 1 to 14, and the initial seed in the first time slot is destination 1. For explanatory purposes, a number of other assumptions are made with respect to the search order table 501. The destinations for the packets that stored within the queues 307 are power constrained, such that two interference regions 503 and 505 are considered. That is, any two destinations associated with queues 1 to 7 are interfering with one another, and any two destinations associated with queues 8 and 14 also interfere with each another. Accordingly, any one destination 1 to 7 does not interfere with any destination from 8 to 14.

It is also assumed that the switch 302 can transmit up to 2 bursts in each downlink time slot, and that there are initially many bursts in each of the 14 destination queues such that they are never empty. In the first time slot $t_1$, the initial seed is destination 1. Accordingly, one burst is transmitted from queue 1. For the second burst, bursts from destinations 2 through 7 cannot be selected because they interfere with the burst from destination 1. Consequently, the burst from queue 8 is transmitted. In the second time slot $t_2$, the initial seed is destination 2, in which one burst will be transmitted from destinations 2 and 8. It is noted that bursts from destinations 3 to 7 cannot be selected because they interfere with the burst from destination 2. In the seventh time slot $t_7$, the initial seed is destination 7; accordingly, one burst will be transmitted from destinations 7 and 8 because queues 7 and 8 belong to different interference regions 503 and 505. During the eighth time slot $t_8$, the initial seed is destination 8. Because destinations 9 to 14 are a part of the same interference region 505 as that of queue 8, the next suitable queue is queue 1. Next, during the ninth time slot $t_9$, the initial seed is destination 9, in which one burst will be transmitted from destinations 9 and 1. In the tenth time slot $t_{10}$, the initial seed is destination 10, such that one burst will be transmitted from destinations 10 and 1.

In the above example, during the time slots $t_1$ to $t_7$, as long as the queue for destination 8 is not empty, one burst will be selected from it ahead of destinations 9 to 14 by virtue of its position in the search order table 501. As a consequence, the queueing delay for bursts in destinations 9 to 14 are higher than that in destination 8. Specifically, the queueing delay for destination 14 will be the longest among destinations 8 to 14. Effectively, under the arrangement of search order table 501, queue 8 has a higher priority than queues 9-14, resulting in an unfair allocation of bandwidth.

It should be noted that the queueing delays for queues 9-14 can be less if queue 8 has no packets to send. For instance, if queues 8 to 13 are empty, then the queueing delay for bursts from destination 14 will be small. Thus, the behavior of the queueing delay depends heavily on the traffic load of each of the queues and can fluctuate widely as the traffic load changes. By constructing a search order table that takes into account the transmission constraints, the worst-case queueing delay can be minimized, according to the process of FIG. 6.

Figure 6:
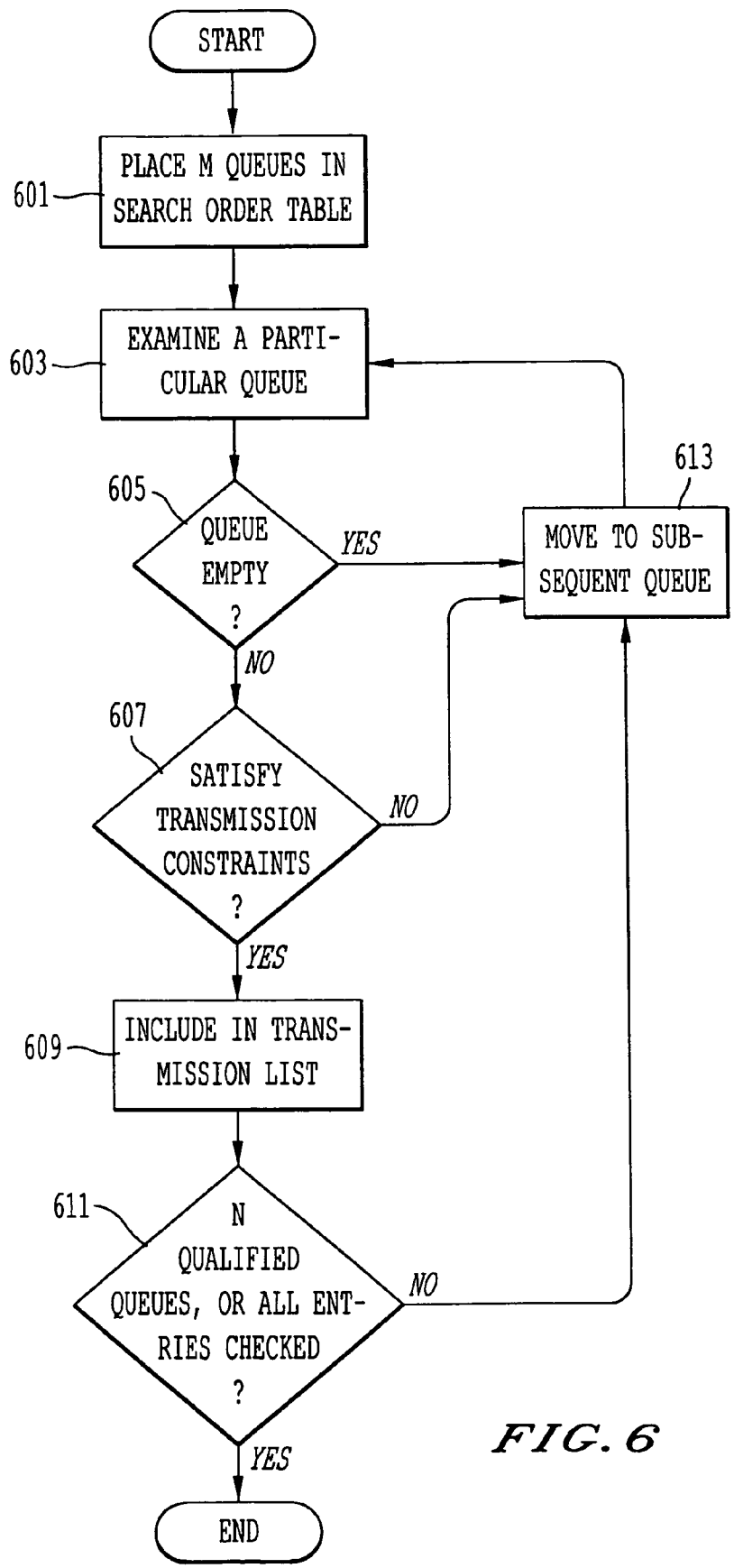
FIG. 6 is a flowchart of the process of scheduling packet transmission, in accordance with an embodiment of the present invention.

FIG. 6 shows a flowchart of the process of scheduling packet transmission, in accordance with an embodiment of the present invention. This process is largely executed by the round-robin scheduler 309 (FIG. 3) within the switch 302. In step 601, all the M queues are "placed" in a search order table and are checked one by one, in sequential order of their positions in the table, to determine whether the bursts within the respective queues qualify for transmission. That is, the numerical values representing the respective M queues are stored in the table entries of the search order table. In step 603, the initial queue (i.e., initial seed) is examined to determine whether it contains bursts to send (step 605). The initial seed indicates the location where the scheduler 309 starts searching for the first qualified transmission. At the end of each search process, (i.e., at the end of each downlink time slot), the value of the initial seed is incremented by one position.

Next, in step 607, the constraint check logic 311 (FIG. 3) checks whether the two transmission constraints are satisfied. According to an exemplary embodiment, the transmission constraints include the following: (1) the destinations, to which the stored bursts are to be sent, do not interfere with one another, and (2) the total power required by all the transmissions is smaller than the peak available power. If the particular queue meets the two transmission constraints, the scheduler 309 includes the queue on the transmission list, per step 609. Subsequently, it is determined, as in step 611, whether there are N such queues in the transmission list or whether all M queues have been examined; if not, the next queue in the search order table is to be examined (step 613).

Turning back to steps 605 and 607, if the particular queue is empty or does not meet the transmission constraints, then step 613 performed in which the next queue is examined. The search process continues until N qualified queues have been found or until all the entries in the search order table have been checked. At the end of the search process, one burst will be transmitted from each of the queues in the transmission list. Sufficient time is allocated to one downlink time slot such that the search process and all the eligible transmissions can be completed. Under this approach, the worst-case queueing delay is minimized, in addition to achieving a more equitable scheme of scheduling.

The resultant class of search order tables ensures that fairness is attained. That is, without such search order tables, there is a good likelihood that certain destinations will be served less often by the switch 302. This situation arises, for example, when the search order table has two or more mutually interfering destinations that are placed close to (or adjacent to) each other in the search table (as explained in the discussion of FIG. 5). The consequence is that queueing delays for destinations (e.g., queue 14 in search order table 501) that are located further down in the search order table can be longer, particularly when many bursts are being sent to the other interfering destinations that are located further up in the search order table.

The potentially long queueing delay that is suffered by delay-sensitive bursts may render the transmissions useless. As a result, the useful capacity of the system 300 will be reduced, and more importantly, the system 300 may not be able to function properly.

FIG. 7A shows a diagram of a search order table, in accordance with an embodiment of the present invention. The process of FIG. 6 results in a search order table 701 that the resultant worst-case queueing delays of all transmissions of the bursts within the corresponding queues can be upper-bounded by some pre-determined values, independent of the pattern and variation of the traffic arriving at the switch 302. Under the assumptions of FIG. 5, the search order table 701 dictates that the queues are to be served in the following order: queue 1, queue 8, queue 2, queue 9, queue 3, queue 10, queue 4, queue 11, queue 5, queue 12, queue 6, queue 13, queue 7, and queue 14. In timeslot $t_1$, bursts from queues 1 and 8 are transmitted. During $t_2$, bursts from queues 8 and 2 are sent. In contrast to the search order table 501 (FIG. 5), the first queue in interference region 505 (i.e., queue 8) is no longer unfairly given an opportunity to transmit bursts during timeslots $t_1$ through $t_7$. The search order table 701 limits the worst-case queueing delay in the switch 302, thereby guaranteeing timely transmissions of delay-sensitive bursts, especially those carrying synchronization and system information.

FIG. 7B shows an exemplary search order table, which accommodates uneven traffic loading of the queues, according to an embodiment of the present invention. If one queue 307 (FIG. 3) is experiencing higher traffic over the other queues, additional table entries corresponding to the queue can be stored. By allowing destinations with high traffic loads to be repeated in the search order table, the switch 302 can schedule more transmissions from those destinations so that they are provided with a larger share of the system capacity. In this example, both queues 7 and 14 experience twice as much traffic as the other queues 1-6, and 8-13; consequently, each of the queues 7 and 14 has two entries in the search order table 703. During time slots $t_6$, $t_7$, $t_{14}$, and $t_{15}$, queue 7 is served; likewise, during time slots $t_7$, $t_8$, $t_{15}$, and $t_{16}$, queue 14 is served. Basically, queues 7 and 14 are given four opportunities to transmit packets during a single period, while the other queues 1-6, and 8-13 have two opportunities.

As a further refinement in search order tables 701 and 703, other constraints can be imposed to construct a search order table that better reflects the particular communication system that employs the scheduler 309.

FIGS. 8A and 8B show exemplary search order tables with two different starting points, in accordance with an embodiment of the present invention. Assuming that each queue (or destination) can appear in the search order table only once, the search order table will have M entries. The switch 302 is capable of transmitting up to N non-interfering bursts in each downlink time slot. The constructed search order table seeks to guarantee a reasonably small upper bound for the queueing delay for all the queues, independent of the traffic load.

According to one embodiment of the present invention, the class of search order tables is characterized by the parameters (K, L) and exhibit two properties (P1 and P2). The first desirable property (referred to as "P1") of the search order tables is that any K consecutive entries in the table do not interfere with one another. Interfering destinations are placed as far apart as possible in the search order table 801. Thus, K should be as large as possible; at a minimum, K≧N. By imposing property P1, it is guaranteed that each queue (or destination) will be selected for transmission at least min (K, N) times in one period, provided that its queue is not empty and only the interference constraint is considered. A period is defined as the number of downlink time slots that is required for the initial seed of the scheduler 309 to go through each of the entry in the search order table once. For each queue or destination in the search order table in which the initial seed is the particular queue or is min(K,N)−1 entries preceding the particular queue, the particular queue or destination will be selected for transmission (i.e., added to the transmission list)

Assuming that each destination is associated with a required transmit power, and the total allowable transmit power in a downlink time slot is limited. This assumption is particularly relevant to satellite communications systems. For explanatory purposes, it is assumed that each destination requires either a low-powered or high-powered transmission. For the system 300, a low-powered and a high-powered transmission correspond to a point-to-point and a cellcast destination, respectively. In constructing the search order table, destinations that require high-powered transmissions should be placed as far as possible from each other.

The second desirable property (referred to as "P2") of the search order tables is that any L consecutive entries in the table can have only one or zero destination that requires a high-powered transmission. As with the parameter K, the largest possible value of L is desirable. By imposing property P2, it is guaranteed that a large number of consecutive entries are selected for transmission in each downlink time slot in which at most a single high-powered transmission is required. Hence, the worst-case queueing delay can be kept to a low value.

For a given set of destinations and their associated power and interference requirements, there are upper limits on the values of K and L. Unfortunately, these upper limits are difficult to compute exactly. However, for the parameter L, a simple upper limit can be obtained from the total number of destinations and the number of high-powered destinations. For the parameter K, the set of all destinations can be partitioned into disjoint "cluster lists" (a cluster list is defined as a set of destinations that interfere with one another). From the size of the largest cluster list and the total number of destinations, a crude estimate can be obtained for K.

As previously mentioned, the search order table 801 and 803 can be constructed to contain multiple entries of the same queue to reflect the traffic load associated with a particular destination. For example, a particular destination may exhibit twice the normal traffic load as any other destinations. To adapt to this imbalance, the busy destination can be placed in the search order table twice while all the other destinations appear only once. In general, the number of times a destination is placed in the search order table is directly proportional to its relative traffic load. In addition, to maintain fairness, all the repetitions of the same destination should be placed as far apart from each other as possible.

To compute the worst-case queueing delay, an exemplary search order table 801 with parameters K≧N=12, and L=6 is shown. It is noted the analysis that is provided below is applicable to any search order table in general. Search order table 801 has K equal to 12 and L equal to 6. For the purposes of explanation, table 801 has two fields: a Position field 801a and a Type field 801b. The Position field 801a stores values corresponding to the M queues that are to be positioned for transmission according to the placement in the table 801. According to one embodiment of the present invention, the Type fields 801b specifies the power requirement for the particular queue or destination. "PTP" stands for point-to-point (or low-powered) and "CC" stands for cellcast (or high-powered) destinations.

The queueing delay bound for point-to-point (or low-powered) transmission is considered, with particular focus on the point-to-point entry at position x. Since the search order table has the parameter K≧N=12, the entry at position x will be selected for transmission if any of the following is true: (1) the initial seed of the scheduler is at position x; (2) the initial seed of the scheduler is at position (x−1), (x−2), ..., or (x−6), and the sum of power (p+q), (p+2q), ..., or (p+6q), respectively, is less than or equal to Pmax, where Pmax is the maximum available transmit power, p is the transmit power of a high-powered (or cellcast) transmission, and q (p≧q) is the transmit power of a low-powered (or point-to-point) transmission; and (3) the initial seed of the scheduler is at position (x−7), (x−8), ..., or (x−11) and the sum of power (2p+6q), (2p+7q), ..., (2p+10q), respectively, is less than or equal to Pmax. The maximum number of transmissions in one downlink time slot is N=12.

Two cases are considered with respect to point-to-point transmissions. In the first case, it is assumed that $2p+6q>Pmax$, (i.e. $p>(Pmax-6q)/2$). The largest integer $n\in\{0,1,\ldots,6\}$ is determined such that $p+nq\leq Pmax$. As a result, the point-to-point entry at position x will be transmitted at least (n+1) times in one period, where one period is defined as the time it takes for the initial seed to go through the entire search order table once.

If that entry appears R times in the table, then the queueing delay bound for point-to-point transmission is as follows:

$$\left\lceil \frac{QL}{(n+1)R} \right\rceil \frac{T \times \text{Size}}{C} \text{seconds.} \quad \text{Eq. (1)}$$

In Eq. (1), QL represents the queue length. There are C downlink time slots available for transmission every T seconds. The number of entries in the search order table is Size. It should be noted that when each destination appears only once in the search order table, Size and M are the same.

In the second case, it is assumed that $2p+6q\leq Pmax$, (i.e. $p\leq(Pmax-6q)/2$). The largest integer $n\in\{6,7,\ldots,10\}$ is determined to satisfy the following expression: $2p+nq\leq Pmax$. The point-to-point entry at position x is transmitted (n+2) times in one period. If that entry appears R times in the table, then the queueing delay bound for point-to-point transmission is as follows:

$$\left\lceil \frac{QL}{(n+2)R} \right\rceil \frac{T \times \text{Size}}{C} \text{seconds.} \quad \text{Eq. (2)}$$

Search order table 803 shows the case of the cellcast transmission, in which the initial seed is at position y. Because the search order table 803 has the parameter $K\geq N=12$, the entry at position y will be selected for transmission if any of the following is true: (1) the initial seed of the scheduler is at position y; (2) the initial seed of the scheduler is at position (y−1), (y−2), . . . , or (y−5), and the sum of power (p+q), (p+2q), . . . , or (p+5q), respectively, is less than or equal to Pmax; and (3) the initial seed of the scheduler is at position (y−6), (y−7), . . . , or (y−11) and the sum of power (2p+5q), (2p+6q), . . . , or (2p+10q), respectively, is less than or equal to Pmax.

As with the PTP transmission, two scenarios of the cellcast transmissions are analyzed. In the first case, it is assumed that $2p+5q>Pmax$, (i.e., $p>(Pmax-5q)/2$). The largest integer $m\in\{0,1,\ldots,5\}$ is determined such that $p+mq\leq Pmax$. The cellcast entry at position y will be transmitted (m+1) times in one period. If that entry appears R times in the table, then the queueing delay bound for point-to-point transmission is as follows:

$$\left\lceil \frac{QL}{(m+1)R} \right\rceil \frac{T \times \text{Size}}{C} \text{seconds.} \quad \text{Eq. (3)}$$

In the second case, $2p+5q\leq Pmax$, (i.e. $p\leq(Pmax-5q)/2$), in which the largest integer $m\in\{5,6,\ldots,10\}$ is determined to satisfy the expression, $2p+mq\leq Pmax$.

The cellcast entry at position y will be transmitted (m+2) times in one period. If that entry appears R times in the table, then the queueing delay bound for cellcast transmission is as follows:

$$\left\lceil \frac{QL}{(m+2)R} \right\rceil \frac{T \times \text{Size}}{C} \text{seconds.} \quad \text{Eq. (4)}$$

Figure 9:
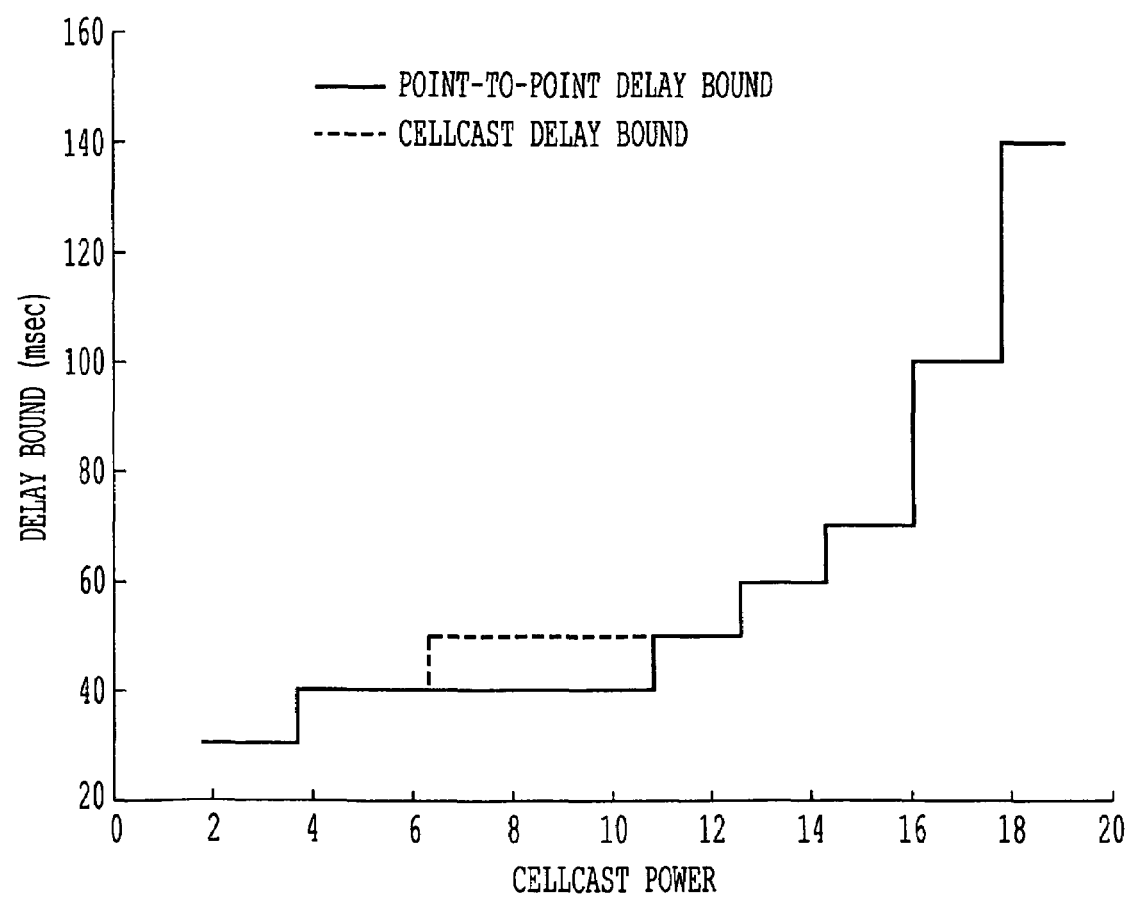
FIG. 9 is a chart of the queueing delay bounds, in accordance with an embodiment of the present invention.

FIG. 9 shows a chart of the queueing delay bounds, in accordance with an embodiment of the present invention. By using search order tables according to the present invention, the maximum queueing delays can be obtained analytically. On the other hand, given any other search order table, a similar analytical approach can be used to derive the maximum queueing delays.

The equations (Eqs. 2-4) factor in the queue length QL of each queue. By limiting the value of QL (e.g., by dropping new arrivals when the queue length is greater than a certain threshold), it is possible to guarantee the queueing delay be no greater than some pre-determined value.

The delay bounds (i.e., Eqs. 1-4) are summarized below for different ranges of the cellcast power p. They are applicable only for search order tables with parameters $K\geq N=12$ and $L=6$.

If $q \leq p \leq \frac{P_{\max} - 6q}{2}$, then $$PTP \text{ queueing delay bound} = \left\lceil \frac{QL}{(n+2)R} \right\rceil \frac{T \times \text{Size}}{C} \text{seconds,}$$

where n is the largest integer in $\{6,7,\ldots,10\}$ such that $2p+nq\leq P_{max}$.

$$\text{Cellcast queueing delay bound} = \left\lceil \frac{QL}{(m+2)R} \right\rceil \frac{T \times \text{Size}}{C} \text{seconds,}$$

where m is the largest integer in $\{5,6,\ldots,10\}$ such that $2p+mq\leq P_{max}$.

If $\frac{P_{\max} - 6q}{2} < p \leq \frac{P_{\max} - 5q}{2}$, then $$PTP \text{ queueing delay bound} = \left\lceil \frac{QL}{(n+1)R} \right\rceil \frac{T \times \text{Size}}{C} \text{seconds,}$$

where n is the largest integer in $\{0,1,\ldots,6\}$ such that $p+nq\leq P_{max}$.

$$\text{Cellcast queueing delay bound} = \left\lceil \frac{QL}{(m+2)R} \right\rceil \frac{T \times \text{Size}}{C} \text{seconds,}$$

where m is the largest integer in $\{5,6,\ldots,10\}$ such that $2p+mq\leq P_{max}$.

If $\dfrac{P_{max} - 5q}{2} < p < P_{max}$, then $$PTP \text{ queueing delay bound} = \left\lceil \dfrac{QL}{(n+1)R} \right\rceil \dfrac{T \times \text{Size}}{C} \text{ seconds,}$$

where n is the largest integer in {0,1, . . . , 6} such that $p+nq \leq P_{max}$.

$$\text{Cellcast queueing delay bound} = \left\lceil \dfrac{QL}{(m+1)R} \right\rceil \dfrac{T \times \text{Size}}{C} \text{ seconds,}$$

where m is the largest integer in {0,1, . . . , 5} such that $p+mq \leq P_{max}$.

As seen in FIG. 9, a plot of the cellcast and point-to-point queue delay bounds as a function of the cellcast power p. The following parameters are used: Size=456, C=136, QL=28, Pmax=21.34, q=1.75, R=1. (K≧N=12, L=6). As the cellcast power p increases, the delay bounds increase according to a step function. Between about 3.6 to 11, the point-to-point delay bound exhibits the largest plateau of about 40 msec. The cellcast delay bound has the largest plateau of about 50 msec. between 6 and about 12.5. At the other p values, point-to-point delay bound and the cellcast delay bound behave identically.

FIGS. 10A-11C show a bandwidth request packet, an allocation packet, and an acknowledgement packet, respectively, in accordance with an embodiment of the present invention. As in FIG. 10A, a request packet 1000 includes the following fields: a destination address field 1001; an uplink rate field 1003; a request type field 1005; a rate request field 1007; a destination downlink field 1009; and a request priority field 1011. The destination address field 1001 specifies the requesting ST's destination address. The uplink rate field 1003 indicates the uplink rate; e.g., 128 kbps, 512 kbps, 2 Mbps, or 16 Mbps. The request type field 1005 indicates whether the request is a rate or volume allocation. The rate request field 1007 permits the ST to specify the requested rate or number of time slots requested. The destination downlink field 1009 specifies the downlink cell where the packets in the requested slots are to be sent. The request priority field 1011 allows the ST to indicate whether the request is a low or high priority. The satellite processes low priority requests, for example, only if there are slots remaining after all high priority requests have been filled.

As seen in FIG. 10B, the allocation packet 1020 contains individual rate and volume allocations with the following information: an ST source address field 1021, a rate/number of slots field 1023, and a last allocation of request field 1025 (meaningful for volume requests only). The address field 1021 stores the address of the requesting ST. The rate/number of slots field 1023 indicates the requested rate (i.e., number of slots in the frame for a given channel). The field 1025 pertains only to volume requests, and specifies whether this is the last allocation.

The acknowledgement packet 1040, as in FIG. 10C, contains individual acknowledgements or denials with the following fields: an ST source address field 1041, a request ID 1043, and a type field 1045. The ST source address field 1041 is the same as field 1021 of the allocation packet. The request ID (identification) field 1043 indicates a particular request for the ST, so that in a volume request, the potentially numerous follow-up requests can be properly managed. The type field 1045 specifies that the BCP 305 is denying the request.

Figure 11:
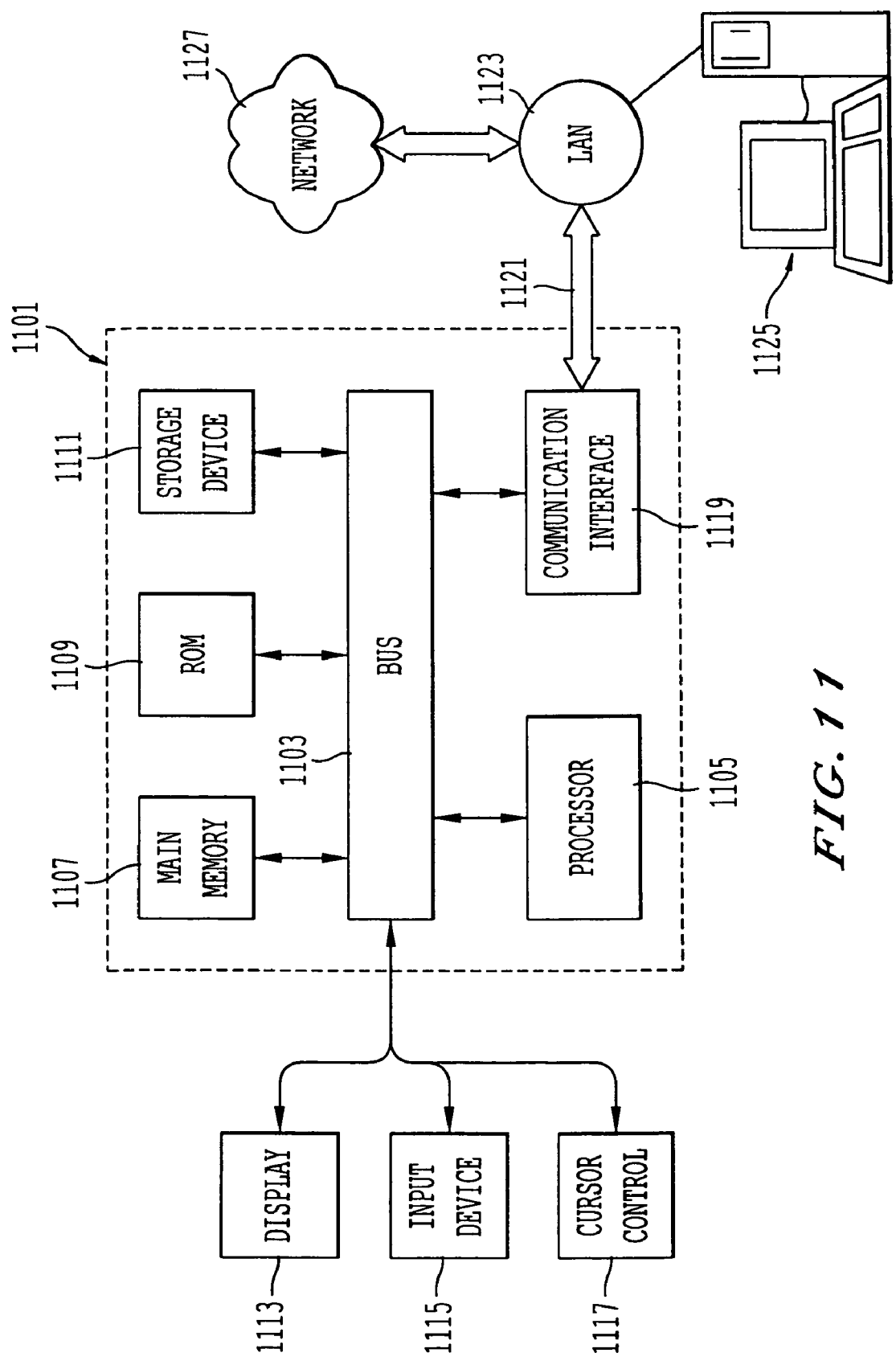
FIG. 11 is a diagram of a computer system that can implement the search order table, in accordance with an embodiment of the present invention.

FIG. 11 illustrates a computer system 1101 upon which an embodiment according to the present invention may be implemented to minimize the queueing delays. Computer system 1101 includes a bus 1103 or other communication mechanism for communicating information, and a processor 1105 coupled with bus 1103 for processing the information. Computer system 1101 also includes a main memory 1107, such as a random access memory (RAM) or other dynamic storage device, coupled to bus 1103 for storing information and instructions to be executed by processor 1105. In addition, main memory 1107 may be used for storing temporary variables or other intermediate information during execution of instructions to be executed by processor 1105. Computer system 1101 further includes a read only memory (ROM) 1109 or other static storage device coupled to bus 1103 for storing static information and instructions for processor 1105. A storage device 1111, such as a magnetic disk or optical disk, is provided and coupled to bus 1103 for storing information and instructions.

Computer system 1101 may be coupled via bus 1103 to a display 1113, such as a cathode ray tube (CRT), for displaying information to a computer user. An input device 1115, including alphanumeric and other keys, is coupled to bus 1103 for communicating information and command selections to processor 1105. Another type of user input device is cursor control 1117, such as a mouse, a trackball, or cursor direction keys for communicating direction information and command selections to processor 1105 and for controlling cursor movement on display 1113.

According to one embodiment, the generation of a class of search order tables is provided by computer system 1101 in response to processor 1105 executing one or more sequences of one or more instructions contained in main memory 1107. Such instructions may be read into main memory 1107 from another computer-readable medium, such as storage device 1111. Execution of the sequences of instructions contained in main memory 1107 causes processor 1105 to perform the process steps described herein. One or more processors in a multi-processing arrangement may also be employed to execute the sequences of instructions contained in main memory 1107. In alternative embodiments, hard-wired circuitry may be used in place of or in combination with software instructions. Thus, embodiments are not limited to any specific combination of hardware circuitry and software.

Further, the queueing mechanism of the present invention may reside on a computer-readable medium. The term "computer-readable medium" as used herein refers to any medium that participates in providing instructions to processor 1105 for execution. Such a medium may take many forms, including but not limited to, non-volatile media, volatile media, and transmission media. Non-volatile media includes, for example, optical or magnetic disks, such as storage device 1111. Volatile media includes dynamic memory, such as main memory 1107. Transmission media includes coaxial cables, copper wire and fiber optics, including the wires that comprise bus 1103. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1105 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 1101 can receive the data on the telephone line and use an infrared transmitter to convert the data to an infrared signal. An infrared detector coupled to bus 1103 can receive the data carried in the infrared signal and place the data on bus 1103. Bus 1103 carries the data to main memory 1107, from which processor 1105 retrieves and executes the instructions. The instructions received by main memory 1107 may optionally be stored on storage device 1111 either before or after execution by processor 1105.

Computer system 1101 also includes a communication interface 1119 coupled to bus 1103. Communication interface 1119 provides a two-way data communication coupling to a network link 1121 that is connected to a local network 1123. For example, communication interface 1119 may be a network interface card to attach to any packet switched local area network (LAN). As another example, communication interface 1119 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1119 sends and receives electrical, electromagnetic or optical signals that carry digital data streams representing various types of information.

Network link 1121 typically provides data communication through one or more networks to other data devices. For example, network link 1121 may provide a connection through local network 1123 to a host computer 1125 or to data equipment operated by a service provider, which provides data communication services through a communication network 1127 (e.g., the Internet). LAN 1123 and network 1127 both use electrical, electromagnetic or optical signals that carry digital data streams. The signals through the various networks and the signals on network link 1121 and through communication interface 1119, which carry the digital data to and from computer system 1101, are exemplary forms of carrier waves transporting the information. Computer system 1101 can transmit notifications and receive data, including program code, through the network (s), network link 1121 and communication interface 1119.

The techniques described herein provide several advantages over prior approaches to minimizing queueing delay. A class of search order tables are generated that satisfy two properties: any K consecutive entries in the table do not interfere with each other, and any L consecutive entries in the table can have only one or zero destination that requires a high-powered transmission. Under this approach, the resultant worst-case queueing delay of a packet switch communication system can be upper-bounded by some reasonably small values. In addition, by repeating busy destinations in the search order table while maintaining the two properties, it is possible to increase the capacity for the busy destinations.

Obviously, numerous modifications and variations of the present invention are possible in light of the above teachings. It is therefore to be understood that within the scope of the appended claims, the invention may be practiced otherwise than as specifically described herein.

What is claimed is:

1. A method of transmission scheduling in a communication system, the method comprising:
    determining order of servicing of a plurality of M queues based on one or more transmission constraints of the communication system, wherein the M queues correspond to different transmission regions, and the transmission constraint prevents transmission of the packets to the transmission regions that are interfering;
    creating a list that includes identifiers corresponding to the plurality of queues, wherein ordering of the identifiers within the list represents the determined order of the servicing of the queues;
    scheduling transmission of packets stored in the M queues based upon the list; and
    transmitting the packets via N number of transmitters, wherein N is less than or equal to M.

2. The method according to claim 1, wherein the communication system includes a satellite communication system.

3. The method according to claim 1, wherein the transmitting step comprises:
    checking whether a particular one of the M queues has a packet stored therein and satisfies the transmission constraint;
    selectively including the particular queue in a transmission list based upon the checking step; and
    iteratively performing steps of checking and selectively including the particular queue until at least one of each of the M queues is checked and N number of the queues are included in the transmission list.

4. The method according to claim 3, wherein the list has K consecutive entries associated with K queues that satisfy the transmission constraint.

5. The method according to claim 4, wherein K is greater than or equal to N.

6. The method according to claim 4, wherein the list has L consecutive entries associated with L queues that satisfy another one of the transmission constraints.

7. The method according to claim 6, wherein each of the transmission regions includes a plurality of destination nodes that are non-interfering, and the other one of the transmission constraints specifies that only one of the destination nodes selectively requires high-powered transmission.

8. The method according to claim 1, further comprising:
    inputting repetitive entry values in the list based upon relative traffic load associated with a plurality of destination nodes.

9. The method according to claim 1, further comprising:
    generating a plurality of lists based upon a plurality of power constraints associated with the communication system;
    storing the plurality of lists; and
    selecting a particular one of the plurality of lists.

10. The method according to claim 1, wherein the list is a search table.

11. An apparatus for providing transmission scheduling, the apparatus comprising:

a processor configured to determine order of servicing of a plurality of M queues based on one or more transmission constraints of the communication system, wherein the M queues correspond to different transmission regions, and the transmission constraint prevents transmission of the packets to the transmission regions that are interfering, the processor being further configured to create a list that includes identifiers corresponding to the plurality of queues, wherein ordering of the identifiers within the list represents the determined order of the servicing of the queues;

a scheduler coupled to the processor and configured to schedule transmission of packets stored in the M queues based upon the list; and N number of transmitters configured to transmit, wherein N is less than or equal to M.

12. The apparatus according to claim 11, wherein the M queues correspond respectively to different transmission regions of a satellite network.

13. The apparatus according to claim 11, wherein the processor is further configured to determine whether a particular one of the M queues has a packet stored therein and satisfies the transmission constraint and to selectively including the particular queue in the list based upon the determination.

14. The apparatus according to claim 13, wherein the list has K consecutive entries associated with K queues that satisfy the transmission constraint.

15. The apparatus according to claim 14, wherein K is greater than or equal to N.

16. The apparatus according to claim 14, wherein the list has L consecutive entries associated with L queues that satisfy another one of the transmission constraints.

17. The apparatus according to claim 16, wherein each of the transmission regions includes a plurality of destination nodes that are non-interfering, and that the other one of the transmission constraints specifies that only one of the destination nodes selectively requires high-powered transmission.

18. The apparatus according to claim 11, further comprising:

means for inputting repetitive entry values in the list based upon relative traffic load associated with a plurality of destination nodes.

19. The apparatus according to claim 11, further comprising:

generating a plurality of lists based upon a plurality of power constraints associated with the communication system;

storing the plurality of lists; and selecting a particular one of the plurality of lists.

20. The apparatus according to claim 11, wherein the list is a search table.

21. A method of forwarding packets via a satellite to a plurality of nodes, the method comprising:

scheduling transmission of the packets stored in a plurality of M queues based upon a search order table that has entries that are ordered to reflect a desired ordering of the queues for servicing, wherein the desired ordering is determined according to a transmission constraint relating to the nodes, wherein the queues correspond to different transmission regions, and the transmission constraint prevents transmission of the packets to the transmission regions that are interfering; and transmitting, via N number of transmitters, wherein N is less than or equal to M, the packets to the nodes over one or more satellite links according to the search order table.

* * * * *